2,878,718
Patented Mar. 24, 1959

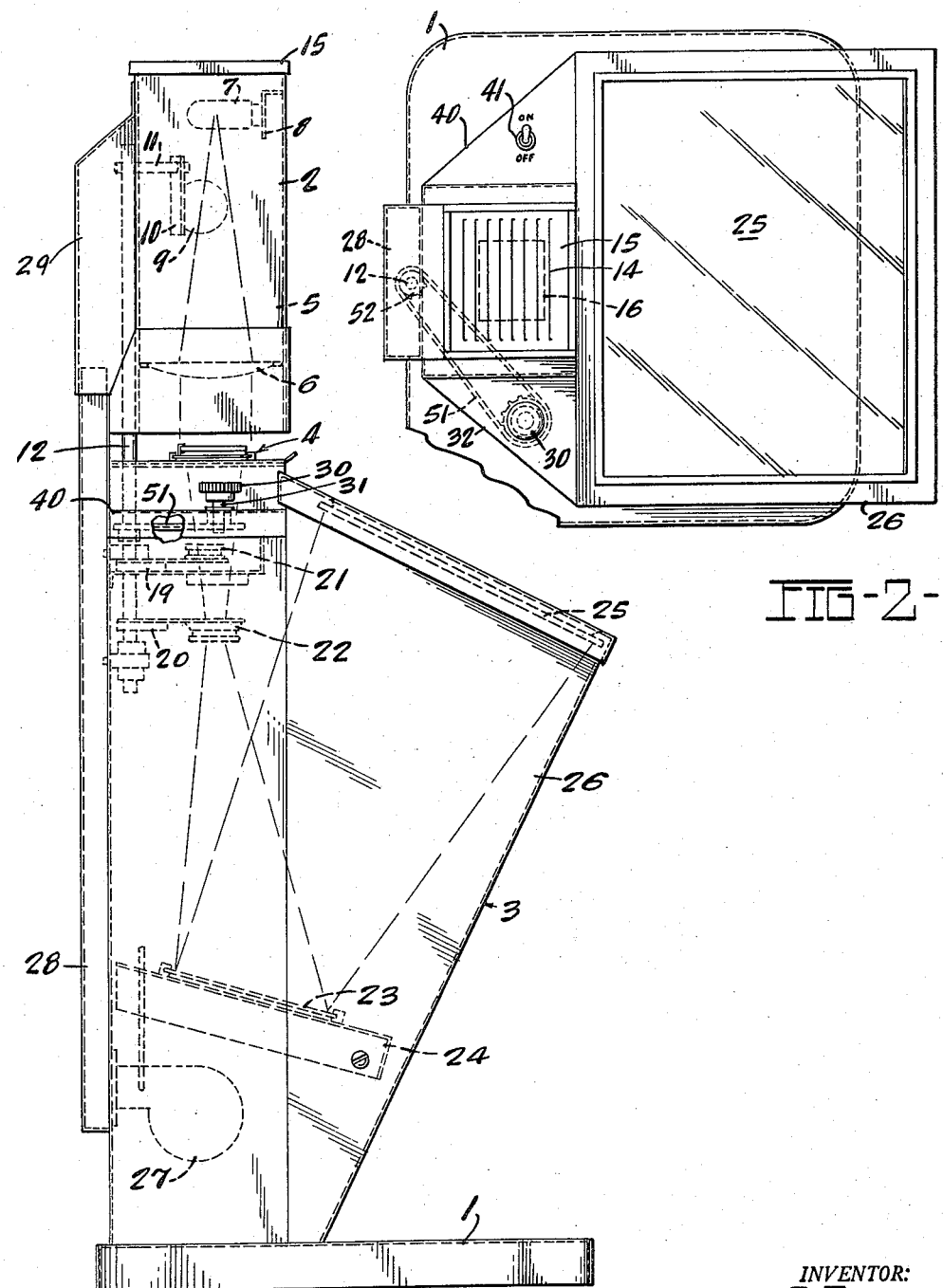

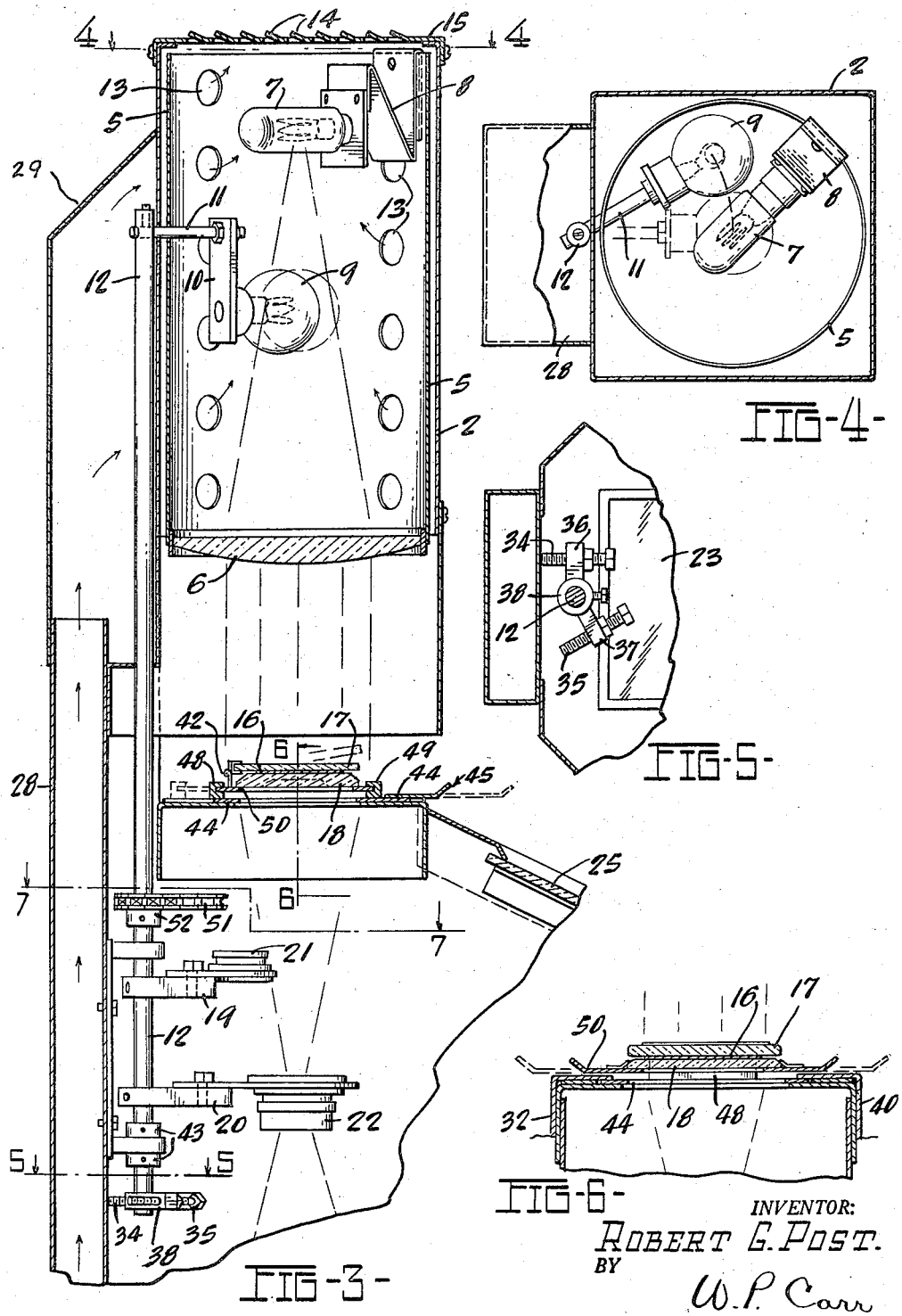

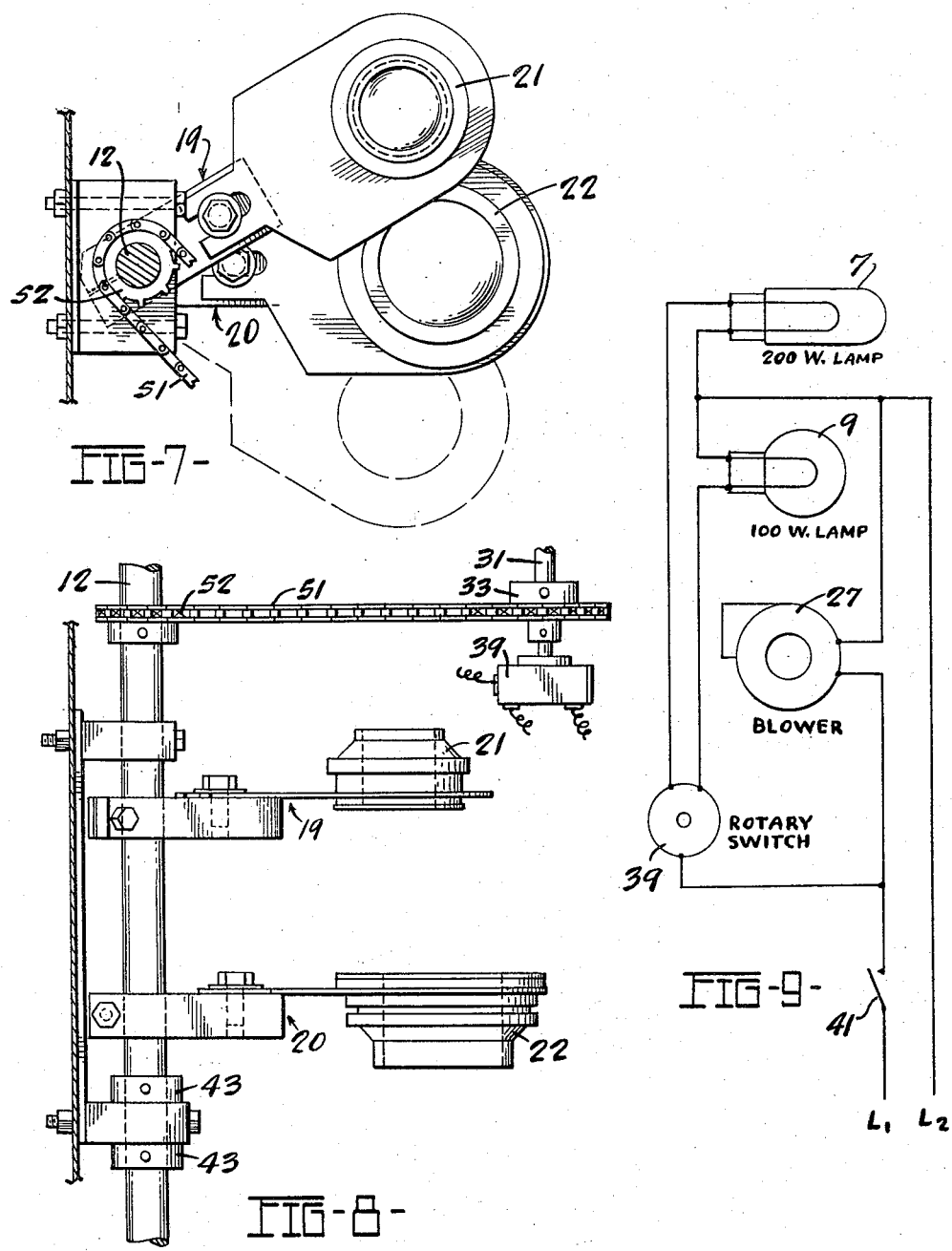

2,878,718
MICROFILM READER

Robert G. Post, Birmingham, Mich., assignor of one-half to Richard C. Carr, Baltimore, Md.

Application January 13, 1955, Serial No. 481,662

5 Claims. (Cl. 88—24)

This invention relates to a reader for projecting and viewing microfilm. While particularly adapted to the use of cut films or slides as the medium containing the reading matter, drawings or illustrations, the features of the invention are also of advantage in the projection of photographic strip film.

Microfilm recording has been utilized for reproducing books and papers of limited editions and other rare or important documents. The economies of its production and storage has made accessible, through its adoption by libraries and other institutions, new sources of knowledge to those interested or working in specialized fields. Industrial concerns have also recognized the benefits of its use.

Its utilization has generally been for the purpose of the projection and viewing of subject matter to be read for which a single magnification is sufficient. Accordingly, beyond some possible preliminary adjustment, a fixed position of lens is usually suitable for viewing a complete film in strip or slide form.

However a different situation is introduced by the practice of industrial establishments of photographing production drawings. In the projection of such film, there is frequently the need of a study of details of a special portion to supplement a survey of the complete drawing. This may necessitate repeated change of the focus of the reader. Such adjustment is time taking and distracting even to those familiar with the procedure and is particularly troublesome for those who are not accustomed to the focusing controls.

The prime object of this invention is the provision of a reader which affords a selection of two pre-focused enlargements one of which may be applied to the whole film and the other to any sectional portion.

It is a further object of the invention to provide quick and effective means for shifting the image on the viewing screen back and forth between the two different magnifications.

These objects are obtained by having two sets of precisely pre-focused lenses and lamps and means under easy control, putting either set in effective position while deactivating the other set, with such means including a switch for separate operation of each lamp.

The advantages and benefits as well as other objects of the invention will be more apparent upon reading the subsequent description and studying the accompanying drawings in which:

Figure 1 is a side elevation of a reader embodying my invention with interior elements in dotted lines;

Figure 2 is a top plan view of the reader of Figure 1;

Figure 3 is an enlarged vertical section of the upper portion of the reader of Figure 1 with various parts shown in elevation;

Figure 4 is a horizontal section taken on the line 4—4 of Figure 3;

Figure 5 is a partial horizontal section taken on the line 5—5 of Figure 3;

Figure 6 is a vertical section of the slides and film holding glass plates taken on the line 6—6 of Figure 3;

Figure 7 is a plan view and partial section of the lenses and their mountings taken on the line 7—7 of Figure 3;

Figure 8 is a side elevation of the elements shown in Figure 7; and

Figure 9 is a diagrammatic layout of the electrical circuit of the device.

Referring to the drawing in more detail, the reader stands on a square floor base 1. The casing of the reader has two main sections, an upper lamp housing 2 and a lower image projection chamber 3. These are spaced slightly apart to provide space between for a film holder 4.

Within the lamp housing 2 is an upright cylindrical drum 5 supporting at its lower end a light condensing lens 6. Centrally located near the top of the drum is a primary projection lamp 7. This is held in fixed position upon a bracket 8. Below lamp 7 is a secondary projection lamp 9 mounted for horizontal swinging movement in an arc terminating at one limit in operative position on the vertical axis of the drum. Lamp 9 is suspended on a vertical strap 10 fastened to an arm 11 which projects from a rotatable vertical rod 12. When primary lamp 7 is being utilized secondary lamp 9 is swung away from the center of the drum so as not to interfere with the projection of light from lamp 7 to the condensing lens 6.

In order to dissipate the heat generated by the lamps the drum 5 has numerous openings 13 through which cooling air is directed. This air flows upwardly through the open top of the drum and out louvers 14 in the cover 15 of the lamp housing 2. The source of this air is a motor driven blower 27 in lower chamber 3. The air from the blower is forced upwards through a duct 28 into a plenum box 29 from which it passes through a port into housing 2 and through the openings 13 into drum 5.

The light from either of the lamps 7 or 9, whichever is being used, passes through condensing lens 6 and is projected through the film 16 held between glass plates 17 and 18.

Below the film on brackets 19 and 20 extending horizontally from the lower end of the rotatable rod 12 are respectively upper lens 21 and lower lens 22. The brackets 19 and 20 are at an angle to each other and of equal length whereby either of the lenses may be swung into optic axial alignment with the film 16, condenser lens 6 and the operative one of the projection lamps 7 and 9.

From the centered lens the image is projected down upon inclined mirror 23 supported upon bracket 24 and reflected at an angle upwardly to translucent viewing screen 25 which is of appropriate fineness in grain and high in dispersion. The screen 25 is at the top of an angled section 26 of the image projection chamber 3.

The shifting of the lenses 21 and 22 putting one or the other into aligned vertical position with one of the lamps 7 and 9 is accomplished through rotation of the hand knob 30. This knob is fastened upon a vertical shaft 31 projecting through a side cover plate 32. Fixed to the shaft 31 below the plate 32 is a sprocket 33 from which a chain 51 runs to a sprocket 52 on vertical rod 12 for rotation of the rod through turning of the knob 30.

The limits of turning of rod 12 is set by stop bolts 34 and 35 which are adjustably held in position by lock nuts in the arms 36 and 37 of a bracket 38 held by a set screw upon the lower end of rod 12 as illustrated in Figure 5.

Below the sprocket 33 on shaft 31 is a rotary switch 39 which at the extreme counterclockwise permitted movement of shaft 31 energizes lamp 7 and alternately at the clockwise limit of rotation of shaft 31 illuminates lamp 9.

Accordingly by turning of the knob 31 clockwise lens 21 is aligned to receive the projection of light from lamp 9 illuminated by such movement and turning of the knob 31 counterclockwise brings lens 22 into operative position with lamp 7 which is coincidentally swung to the center and connected to the electrical source with the circuit to lamp 9 disconnected.

On the opposite side of the reader from side cover plate 31 is a corresponding plate 40. Mounted on this plate is a master toggle switch 41 controlling entry of current to the full electrical circuit of the reader shown in Figure 9.

In utilizing the reader the cut film 16 carrying the drawing to be examined is inserted between glass plates 17 and 18. This is accomplished by pulling the film carrier forwardly and raising upper glass plate 17 on its hinged mounting 42 which is clamped to the rear edge of the glass plate. The film is first centered for overall magnification.

With the master switch 41 snapped to its "on" position the knob 31 is turned clockwise. This turns rotary switch 39 to energize lamp 9 and through sprocket 33 rotates vertical rod 12 supported on bearings 43 to bring lens 21 in alignment with lamp 9 and the condenser lens 6. With this arrangement the image on cut film 16 in its entirety is projected upon mirror 23 and reflected upon viewing screen 25.

Then for study of details of the drawing knob 31 is turned in the opposite direction to the limit set by stop bolt 34 establishing lens 22 in alignment with condenser lens 6 and lamp 7 which is illuminated by the coincidental rotation of switch 39.

The film carrier is composed of an apertured main slide 44 with a handle 45 on its front edge for moving the slide in and out within side guide slots beneath the upwardly and inwardly extending edges of adjacent panels 32 and 40. Opposed gibs 48 and 49 are soldered upon main slide 44. They run crossways of the main slide and are spaced to receive in their grooves the edges of the laterally reciprocable apertured upper slide 50 to which are fixed the stationary lower glass plate 18 and the hinged upper glass plate 17.

By moving these slides any part of the film may be placed in the line of projection for reproduction on the viewing screen. A preferred lens system for study of detail confines the enlargement to a quarter section of the image on the film. By manipulation of the slides this section may be not only any geometric quarter but any intermediate portion of corresponding area.

The particular lenses found suitable for this preferred system are a Wollensak 101 mm. $f$ 4.5 with its face up for the upper lense and a Wollensak 162 mm. $f$ 4.5 with its face down for the lower lens. These provide an enlargement of 5× of the full image and 9½× for quarter sections.

A projection lamp of 200 watt is recommended for the upper stationary lamp while a lamp of 100 watt is satisfactory for the swingably mounted lower lamp.

It may be seen from the foregoing description that the invention provides a reader which has a very useful choice of enlargements and which has easily operated controls.

Changes in the lenses and other elements of the optical system may be made in the disclosed embodiment of the invention to meet special conditions without departing from the spirit of the invention or going beyond the scope of the appended claims.

What is claimed is:

1. In a reader of the type described, a viewing screen, a holder positioning film containing matter to be projected upon the viewing screen transverse of the optical axis of the reader, a light source directing light rays through film in the holder, two projecting lenses of different magnification, means for selectively moving either of the two lenses into pre-focused operative position to project the image of the film in the holder upon the viewing screen, said light source having a different position along the optical axis of the reader for each lens, said light source comprising two illuminating lamps of different magnitude having separate, definite, operative positions spaced along the optical axis of the reader, each of said lamps adapted to function in correlation with a particular one of the projecting lenses, and means actuating the respective correlated lamp with the moving of either lenses into pre-focused operative position, the lamp of the greater magnitude being actuated with the moving of the lens of greater magnification into pre-focused operative position.

2. A reader according to claim 1 in which a condenser lens is between the operative positions of the lamps and the film holder, and the operative position of the lamp of the greater magnitude being farther away from the condenser lens than the operative position of the other lamp.

3. A reader according to claim 1 in which one of the lamps is fixed in operative position and there are means swingably mounting the other lamp by which the other lamp may be moved into and out of its operative position.

4. A reader according to claim 1 in which the means for selectively moving either of the two lenses into pre-focused operative position comprises a rotatable rod and arms projecting radially from said rod upon which the lenses are carried.

5. A reader according to claim 4 in which another arm projecting radially from the rod supports one of the lamps, whereby said lamp and the lens with which it is correlated are moved together into the optical axis of the reader by rotation of the rod.

References Cited in the file of this patent
UNITED STATES PATENTS

| | | |
|---|---|---|
| 2,230,573 | Mestre | Feb. 4, 1941 |
| 2,313,639 | Hauser | Mar. 9, 1943 |
| 2,432,704 | Warman | Dec. 16, 1947 |
| 2,525,957 | Schuler | Oct. 17, 1950 |
| 2,596,376 | Goeij | May 13, 1952 |